United States Patent [19]
Araki et al.

[11] Patent Number: 6,164,482
[45] Date of Patent: Dec. 26, 2000

[54] STRING-ATTACHED CAP

[75] Inventors: Shinji Araki; Eiichi Asakura; Tatsuo Yamada, all of Tokyo, Japan

[73] Assignee: Calsonic Kansei Corporation, Tokyo, Japan

[21] Appl. No.: 09/287,657

[22] Filed: Apr. 7, 1999

[51] Int. Cl.[7] .................................................. B65D 55/16
[52] U.S. Cl. ................................. 220/375; 220/DIG. 33; 296/97.22; 428/36.4
[58] Field of Search .................................... 220/288, 375, 220/88.1, DIG. 33; 296/97.22; 428/36.4, 35.7

[56] References Cited

U.S. PATENT DOCUMENTS

| | | |
|---|---|---|
| 4,320,853 | 3/1982 | Moore . |
| 4,373,063 | 2/1983 | Sakano et al. ............................ 525/64 |
| 4,705,190 | 11/1987 | Mizusawa . |
| 5,697,200 | 12/1997 | Insley et al. .............................. 53/430 |
| 5,720,409 | 2/1998 | Asakura et al. . |
| 5,798,060 | 8/1998 | Brevett .................................. 252/520.1 |
| 5,992,669 | 11/1999 | Hagano et al. . |
| 5,993,696 | 11/1999 | Hanhi et al. ............................ 252/500 |
| 5,996,830 | 12/1999 | Hagano et al. . |
| 6,003,709 | 12/1999 | Hagano et al. . |

FOREIGN PATENT DOCUMENTS

| | | |
|---|---|---|
| 62-173321 | 7/1987 | Japan . |
| 3-295723 | 12/1991 | Japan . |
| 16211821 | 8/1998 | Japan . |
| 11180171 | 6/1999 | Japan . |

*Primary Examiner*—Stephen K. Cronin
*Attorney, Agent, or Firm*—Sughrue, Mion, Zinn, Macpeak & Seas, PLLC

[57] ABSTRACT

In a string-attached cap in which one end of an elongated coupling member is connected to a capping member, the capping member is formed of an electroconductive resin, and the coupling member is also formed of an electroconductive resin which is flexible.

8 Claims, 9 Drawing Sheets

STRING-ATTACHED CAP

BACKGROUND OF THE INVENTION

1. Field of the Invention

The present invention relates to a string-attached cap in which one end of an elongated coupling member is connected to a cap.

2. Description of the Related Art

In a fuel tank of an automobile, a cap is, in general, connected to the fuel tank by means of an elongated coupling member to prevent the loss of the cap during re-fueling. As such string-attached caps, those disclosed in, for example, Japanese Patent Publications No. Hei. 3-295723 and Sho. 62-173321 or the like are known.

FIG. 18 shows the string-attached cap disclosed in Japanese Patent Publication No. Hei. 3-295723, and in this string-attached cap one end of a coupling member 3 is connected to a handle portion 5a of a cap 5 by means of a fixing member 1.

However, with such a conventional string-attached cap, since the coupling member 3 is connected to the handle portion 5a of the cap 5, there has been a problem in that the coupling member 3 obstructs the operation of turning the cap 5.

In addition, since the coupling member 3 is connected to the cap 5 by means of the fixing member 1, there has been a problem in that the number of component parts increases, requiring a large number of steps in assembly.

A string-attached cap disclosed in U.S. Pat. No. 5,720,409 was developed to overcome these problems.

FIG. 19 shows this string-attached cap. This string-attached cap is arranged such that a coupling member 13, which is formed of flexible resin, has a ring part 13a formed integrally at one end thereof, and an engaging part 13b formed integrally with the inner periphery of the ring part 13a is rotatably engaged in an annular groove lid formed in the outer periphery of a cap 11.

With this string-attached cap, since the ring part 13a of the coupling member 13 is inserted and fitted in the annular groove 11d formed in the cap 11, the coupling member 13 does not constitute an obstruction when the cap 11 is turned while gripping a handle portion 11b.

In addition, when the cap 11 is inserted into the ring portion 13a of the coupling member 13, the engaging part 13b at the inner periphery of the ring part 13a is elastically deformed, and if the cap 11 in this state is inserted up to the annular groove 11d, the engaging part 13b is restored to its original state and is engaged in the annular groove 11d, so that the number of assembling steps can be substantially reduced as compared with the conventional art.

However, with the string-attached cap in the above-described document, at the time of removing the cap from the fuel tank, there has been the risk of occurrence of spark discharge as static electricity charged in the human body is discharged through fingers and the like which came into contact with the cap.

SUMMARY OF THE INVENTION

The present invention has been devised to overcome the above-described problems of the conventional art, and its object is to provide a string-attached cap which is capable of easily and positively preventing the occurrence of spark discharge when the human body comes into contact with the cap after the cap is opened.

In the present invention, there is provided a string-attached cap comprising: a capping member formed of a first electroconductive resin; and an elongated coupling member having one end connected to the capping member, the elongated coupling member being formed of a second electroconductive resin which is flexible.

In this string-attached cap, static electricity charged in the human body is allowed to pass through the capping member and the coupling member both formed of electroconductive resin, and escape to the vehicle body side.

In addition, there is provided a string-attached cap comprising: a capping member formed of a first electroconductive resin; an elongated coupling member having one end connected to the capping member, the elongated coupling member being formed of a second electroconductive resin which is flexible; and a fastening member formed of a third electroconductive resin and adapted to fasten one end of the coupling member to the capping member.

In this string-attached cap, static electricity charged in the human body is allowed to pass through the coupling member through the capping member and the fastening member both formed of electroconductive resin, and escape to the vehicle body side.

Further, there is provided a string-attached cap comprising: a capping member formed of a first electroconductive resin; an elongated coupling member having one end connected to the capping member, the elongated coupling member being formed of a second electroconductive resin which is flexible; and a fastening member formed of a third electroconductive resin and adapted to fasten one end of the coupling member to the capping member.

In this string-attached cap, static electricity charged in the human body is allowed to pass through the coupling member through the capping member, the ring member, and the fastening member respectively formed of electroconductive resin, and escape to the vehicle body side.

Further, there is provided a string-attached cap comprising: a capping member formed of a first electroconductive resin; a ring member formed of a second electroconductive resin and adapted to be engaged in an outer periphery of the capping member; an elongated coupling member having one end connected to the ring member, the elongated coupling member being formed of a third electroconductive resin which is flexible; and a fastening member formed of a fourth electroconductive resin and adapted to fasten one end of the coupling member to the ring member.

In this string-attached cap, static electricity charged in the human body is allowed to pass through the coupling member formed of electroconductive resin and escape to the vehicle body side.

In addition, if the cap is inserted into the ring part of the coupling member, the engaging part at the inner periphery of the ring part is elastically deformed, and if, in this state, the cap is inserted up to the annular groove, the engaging part is restored to its original state and is engaged in the annular groove.

All the electroconductive resins in the above-described string-attached cap are each formed by mixing one of carbon powder, carbon fibers, and metal fibers into an insulating polymer.

The features and advantages of the present invention will be described in such a manner as to be apparent from the following detailed description and the accompanying drawings.

DETAILED DESCRIPTION OF THE PREFERRED EMBODIMENTS

Referring now to the accompanying drawings, a description will be given of the details of the embodiments of the present invention.

Figure 1:
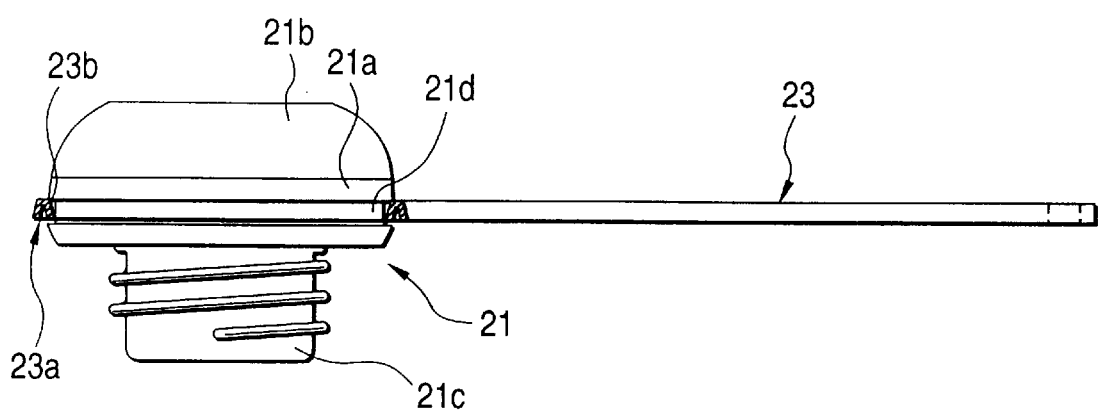
FIG. 1 is a side elevational view, partly in section, of a first embodiment of the string-attached cap in accordance with the present invention.
Figure 2:
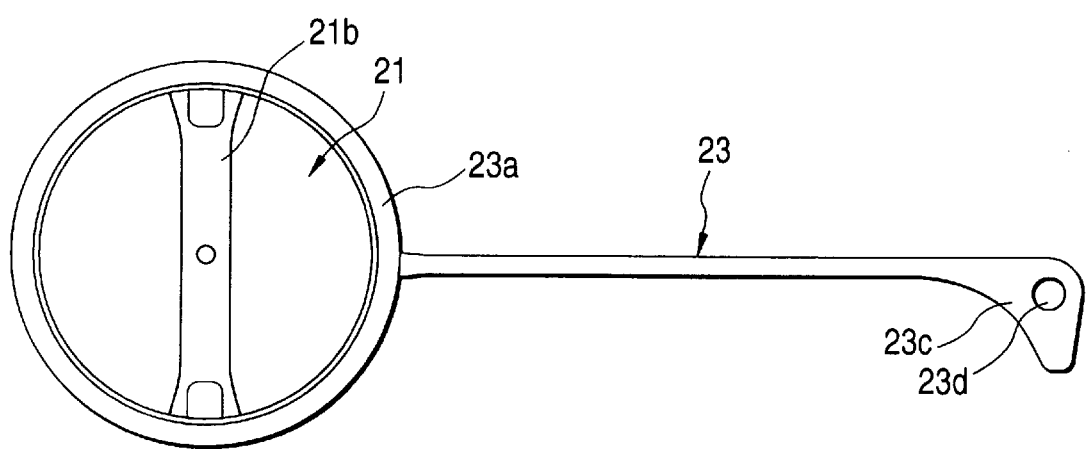
FIG. 2 is a top view of FIG. 1.

FIGS. 1 and 2 show a first embodiment of the string-attached cap in accordance with the present invention, and in the drawings reference numeral 21 denotes a cap for a fuel tank of an automobile.

This cap 21 is formed of an electroconductive resin, and a handle portion 21b is formed on one side of a cap body 21a, and a threaded part 21c on the other side thereof.

An annular groove 21d is formed in the outer periphery of the cap body 21a.

Reference numeral 23 denotes an elongated flexible coupling member formed of an electroconductive resin.

In this embodiment, the electroconductive resin for forming the cap 21 and the coupling member 23 is formed by mixing carbon powder (carbon black) into a flexible insulating polymer.

As the insulating polymer, it is possible to cite a polyamide such as nylon 66, a polyamide elastomer, polyester, a polyester elastomer, and the like.

Among others, the material for forming the coupling member 23 requires particular attention. The reason is that since the cap is opened and closed repeatedly, the coupling member 23 is required to have bending resistance. As one example of a polymer which meets this bending resistance, it is desirable to use a polyester elastomer constituted by a block copolymer of a hard segment and a soft segment which respectively have the structures shown below (tradename: "HYTREL" made by DUPONT-TORRAY CO., LTD.). The point to be noted in this block copolymer is that the soft segment contains a polyether component.

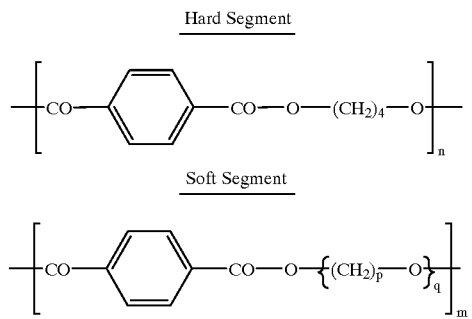

Ester linkage is used as the basic structure of the hard segment and the soft segment, but the present invention is not limited to the same, and amide linkage may be adopted as the basic structure of the two segments. In this case as well, the soft segment should desirably contain a polyether component.

In general, due to the mixing in of carbon powder, the flexible polymer has the tendency of becoming hard and brittle, so that the mixing in of carbon powder is not desirable. However, since the aforementioned resin is adopted, even if carbon powder is mixed in, it is possible to obtain sufficient bending resistance.

In addition, as for the electroconductive resin for forming the cap 21 and the coupling member 23, resins of the same type or different types may be adopted.

An annular ring part 23a is formed integrally at one end of the coupling member 23.

Figure 3:
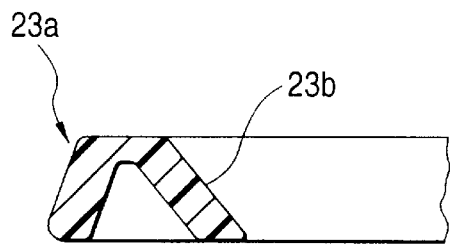
FIG. 3 is a cross-sectional view of a ring part in FIG. 1.

As shown in FIG. 3, this ring part 23a in its cross-sectional shape is formed in an inverse V-shape, and its inner peripheral side is formed as an engaging part 23b.

This engaging part 23b is rotatably engaged in the annular groove 21d formed in the outer periphery of the cap body 21a.

It should be noted that a triangular attaching portion 23c is formed integrally at the other end of the coupling member 23, and an attaching hole 23d is formed in this attaching portion 23c.

In the above-described string-attached cap, if the cap body 21a is inserted into the ring part 23a of the coupling member 23, the engaging part 23b at the inner periphery of the ring part 23a is elastically deformed and its diameter is enlarged. If, in this state, the cap body 21a is inserted up to the annular groove 21d, the engaging part 23b is restored to its original state and is engaged in the annular groove 21d.

Figure 4:
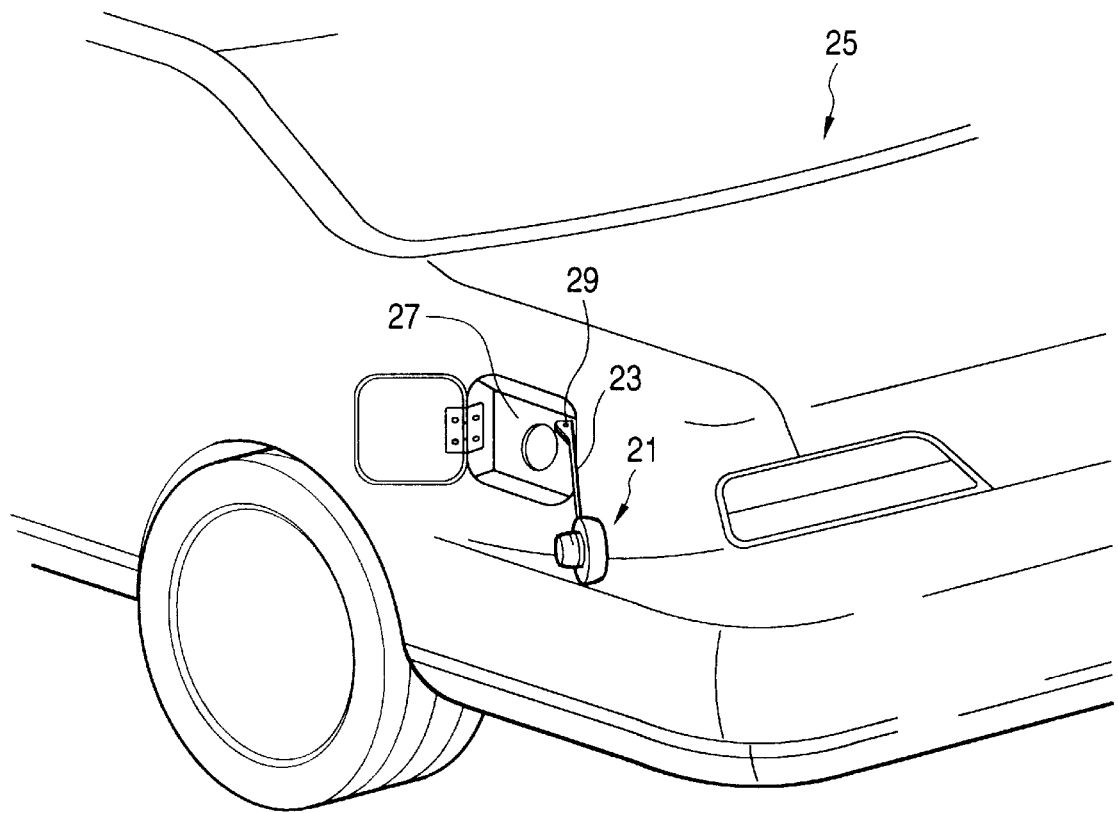
FIG. 4 is a perspective view illustrating a state in which the string-attached cap shown in FIG. 1 is disposed on a fuel tank.

Then, as shown in FIG. 4, the above-described string-attached cap is used as the attaching portion 23c formed at the other end of the coupling member 23 is rotatably fixed to a fuel tank 27 of an automobile 25 by means of a pin 29.

In the string-attached cap constructed as described above, since the cap 21 and the coupling member 23 are formed of flexible electroconductive resin, static electricity occurring in the cap 21 and the coupling member 23 is allowed to gradually escape to the vehicle body side through the coupling member 23, with the result that it is possible to easily and positively prevent the cap 21 and the coupling member 23 from becoming electrically charged. In addition, as the operator touches the cap 21 during re-fueling, it is possible to allow static electricity charged in the human body to escape to the vehicle body side before opening the cap.

It should be noted that, according to an experiment, it was confirmed that if the content of carbon powder in the conductive resin is greater than or equal to 6 wt. % in the cap 21 and greater than or equal to 5 wt. % in the coupling member 23, the surface resistance of the cap 21 and the coupling member 23 becomes small, so that sufficient electrical conductivity can be imparted to the cap 21 and the coupling member 23.

In addition, in the above-described string-attached cap, since the ring part 23a of the coupling member 23 is inserted and fitted in the annular groove 21d formed in the cap body 21a, the coupling member 23 does not constitute an obstruction when the cap 21 is turned while gripping the handle portion 21b.

Further, if the cap body 21a is inserted into the ring part 23a of the coupling member 23, the engaging part 23b at the inner periphery of the ring part 23a is elastically deformed, and if, in this state, the cap body 21a is inserted up to the annular groove 21d, the engaging part 23b is restored to its original state and is engaged in the annular groove 21d. Therefore, the number of assembling steps can be substantially reduced as compared with the conventional art.

In addition, in the above-described string-attached cap, since the cross section of the ring part 23a is formed in a V-shape, and the inner periphery is formed as the engaging part 23b, it is possible to allow the elastic deformation of the engaging part 23b to take place easily and positively.

Figure 5:
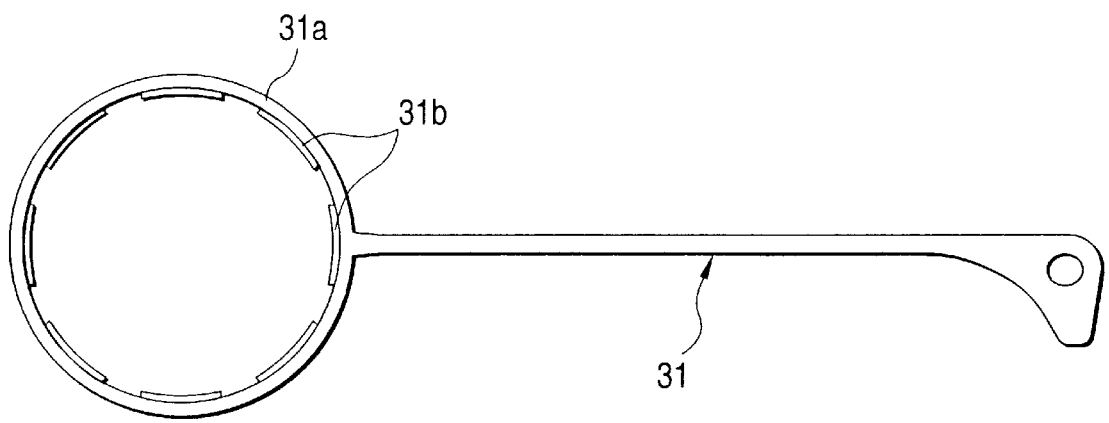
FIG. 5 is a top view illustrating a coupling member in a second embodiment of the string-attached cap in accordance with the present invention.
Figure 6:
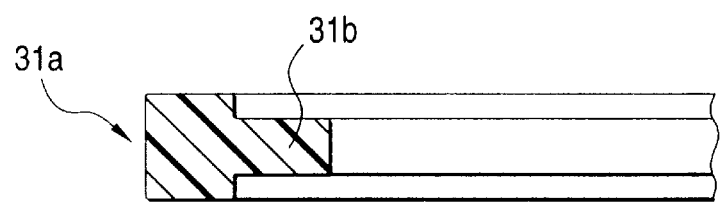
FIG. 6 is a cross-sectional view of a ring part in FIG. 5.

FIGS. 5 and 6 show a coupling member 31 in accordance with a second embodiment of the string-attached cap of the present invention. In this embodiment, the engaging part is formed by a plurality of protrusions 31b which protrude inwardly from a ring part 31a at predetermined angles.

Then, if the cap body 21a is inserted into the ring part 31a, the protrusions 31b are elastically deformed in a direction away from the inserting side. If, in this state, the cap body 21a is inserted up to the annular groove 21d, the protrusions 31b are restored to their original state and are engaged in the annular groove 21d.

In this embodiment, since the engaging part is formed by the plurality of protrusions 31b which protrude inwardly from the ring part 31a at predetermined angles, the elastic deformation of the engaging part can be allowed to take place easily and positively in the same way as in the first embodiment.

Figure 7:
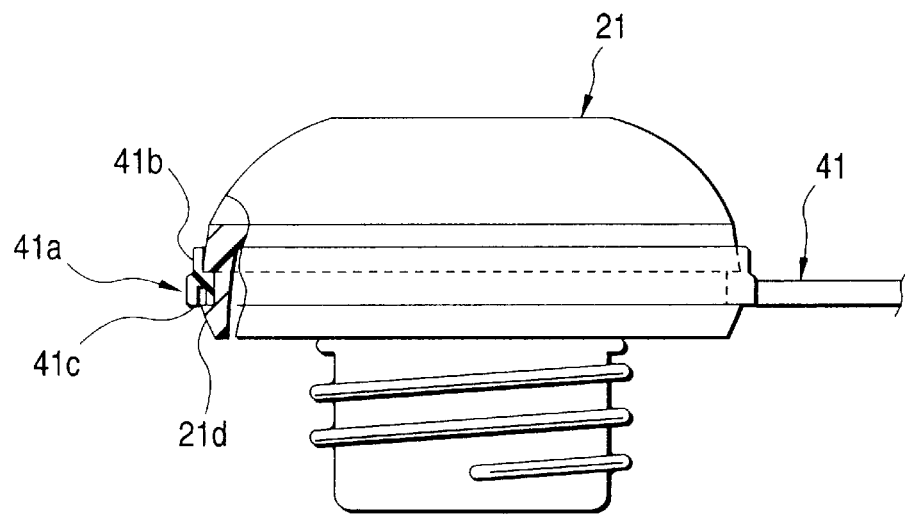
FIG. 7 is a side elevational view, partly in section, of a third embodiment of the string-attached cap in accordance with the present invention.
Figure 8:
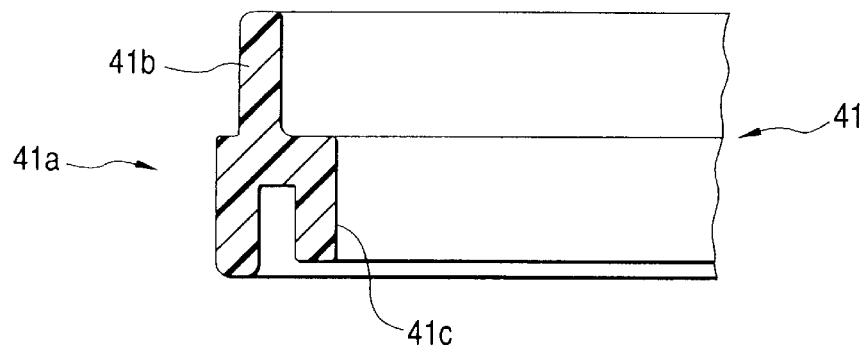
FIG. 8 is a cross-sectional view of a ring part in FIG. 7.

FIGS. 7 and 8 show a third embodiment of the string-attached cap in accordance with the present invention. In this embodiment, an annular protruding portion 41b protruding in the vicinity of the annular groove 21d at the outer periphery of the cap 21 is formed integrally with a ring part 41a of a coupling member 41.

It should be noted that this annular protruding portion 41b projects in a direction away from an engaging portion 41c.

In this string-attached cap, when a force acts between the cap 21 and the coupling member 41, the annular protruding portion 41b abuts against the outer periphery of the cap 21, and the aforementioned force is alleviated by the annular protruding portion 41b, so that the force acting on the engaging portion 41c becomes small.

Consequently, the resilient deformation of the engaging portion 41c due to the aforementioned force becomes small, and the engaging portion 41c is prevented from coming off the annular groove 21d.

In addition, since the aforementioned force is dispersed to the annular protruding portion 41b and the engaging portion 41c, the rotation of the cap 21 becomes smooth.

Figure 9A:
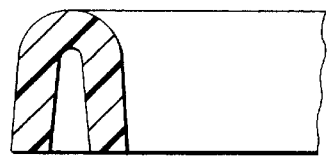
FIGS. 9A and 9B are cross-sectional views illustrating other examples of the coupling member of the string-attached cap in accordance with the present invention.

It should be noted that although, in the above-described first embodiment, a description has been given of the example in which the cross section of the ring part 23a of the coupling member 23 is formed substantially in a V-shape, the present invention is not limited such an example, and the cross section of the ring part 23a of the coupling member 23 may be formed substantially in a U-shape, as shown in FIG. 9A.

Figure 9B:
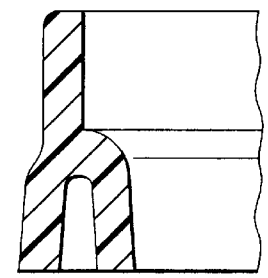

In addition, although, in the above-described third embodiment, a description has been given of the example in which the cross section of the engaging portion 41c in the ring part 41a of the coupling member 41 is formed in a rectangular shape, the present invention is not limited to such an example. For example, as shown in FIG. 9B, the cross section of the engaging portion 41c may be formed substantially in a U-shape.

Figure 10:
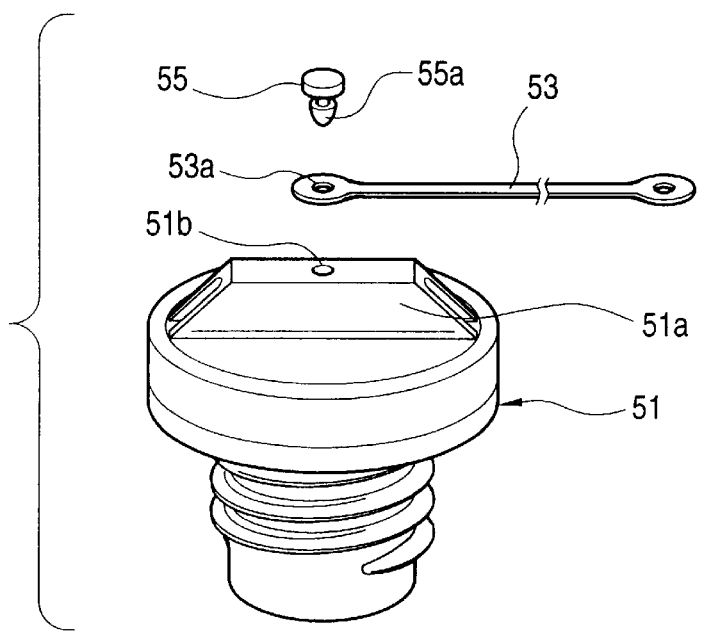
FIG. 10 is a perspective view illustrating a fourth embodiment of the string-attached cap in accordance with the present invention.

FIG. 10 shows a fourth embodiment of the string-attached cap in accordance with the present invention. In this embodiment, one end of a coupling member 53 is connected to a handle portion 51a of a cap 51 through a fastening member 55.

Figure 11:
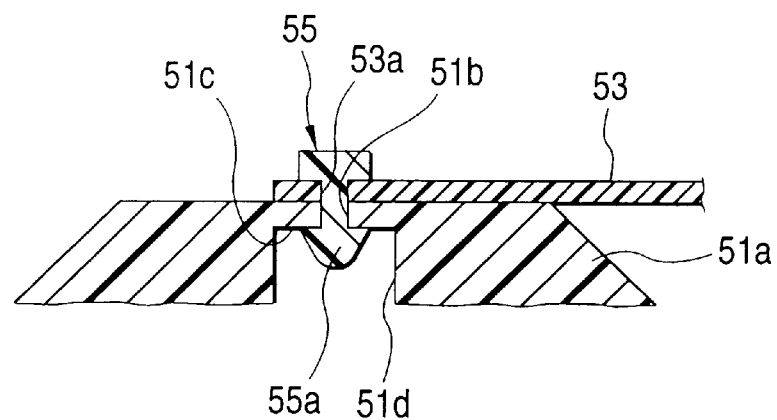
FIG. 11 is a cross-sectional view illustrating a state in which the coupling member shown in FIG. 10 is fastened to a handle portion.

Namely, in this embodiment, as shown in FIG. 11, an attaching hole 51b for insertion of an retaining portion 55a formed at a tip of the fastening member 55 is formed in the handle portion 51a of the cap 51, and a retaining hole 51d is formed via a stepped portion 51c.

In a state in which the retaining portion 55a of the fastening member 55 is inserted in a through hole 53a formed at one end of the coupling member 53, the retaining portion 55a of the coupling member 55 is inserted in the retaining hole 51d in the handle portion 51a, thereby fastening the coupling member 53 to the handle portion 51a.

In this embodiment, the coupling member 53 is formed of flexible electroconductive resin.

In addition, in the same way as the cap 51 and the coupling member 53, the fastening member 55 is also formed of elastic electroconductive resin.

Further, the cap 51 is formed of electroconductive resin.

In the string-attached cap of this embodiment, since the coupling member 53 and the fastening member 55 are formed of the electroconductive resin, static electricity generated in the cap 51 is allowed to pass through the coupling member 53 through the fastening member 55 and escape to the vehicle body side. Consequently, it is possible to easily and positively prevent the cap 51 and the coupling member 53 from becoming charged with static electricity.

Figure 12:
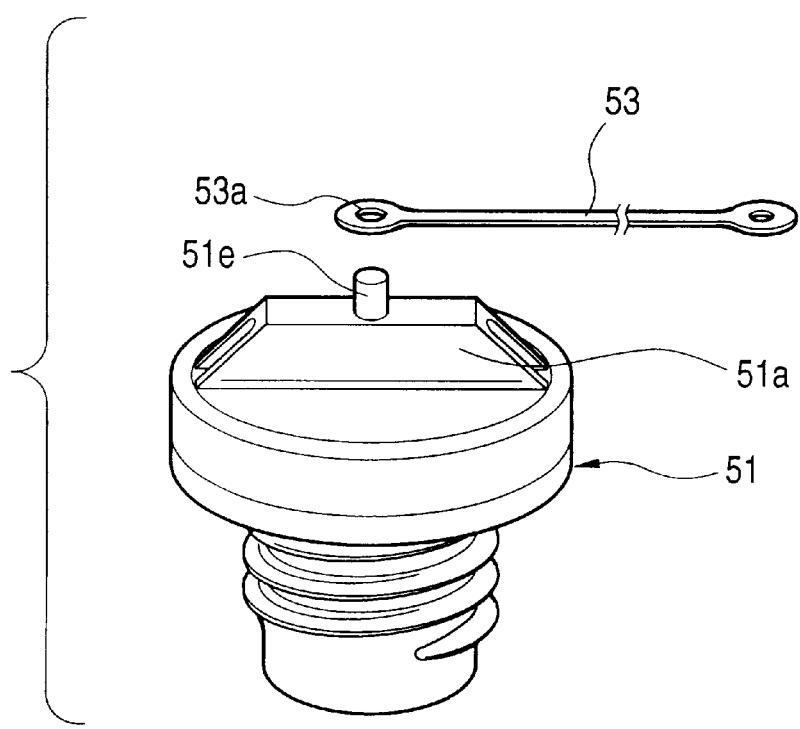
FIG. 12 is a perspective view illustrating a fifth embodiment of the string-attached cap in accordance with the present invention.

FIG. 12 shows a fifth embodiment of the string-attached cap in accordance with the present invention. In this embodiment, a fastening member 51e is formed integrally with the handle portion 51a of the cap 51.

Figure 13:
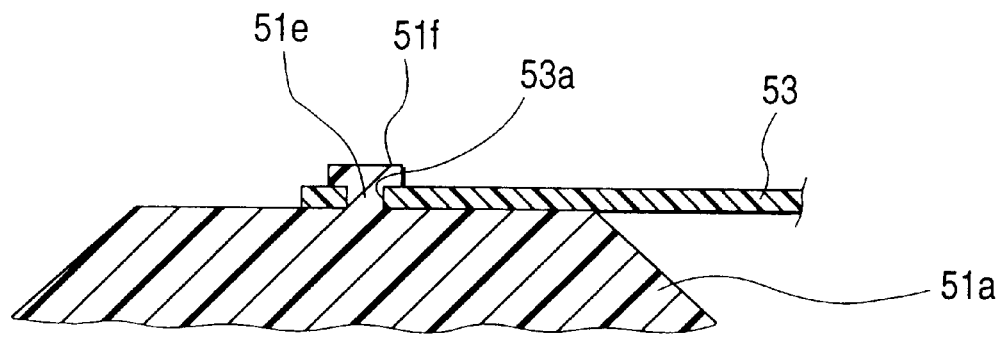
FIG. 13 is a cross-sectional view illustrating a state in which the coupling member shown in FIG. 12 is fastened to the handle portion.

In this embodiment, as shown in FIG. 13, in a state in which the fastening member 51e is fitted in the through hole 53a formed at one end of the coupling member 53, the diameter of a distal end of the fastening member 51e is enlarged by means of heat or ultrasonic waves so as to form a calked portion 51f, thereby fastening the coupling member 53 to the handle portion 51a.

In this embodiment, the coupling member 53 is formed of flexible electroconductive resin.

In addition, the fastening member 51e and the cap 51 are formed of electroconductive resin.

In the string-attached cap of this embodiment as well, it is possible to obtain advantages similar to those of the fourth embodiment.

Figure 14:
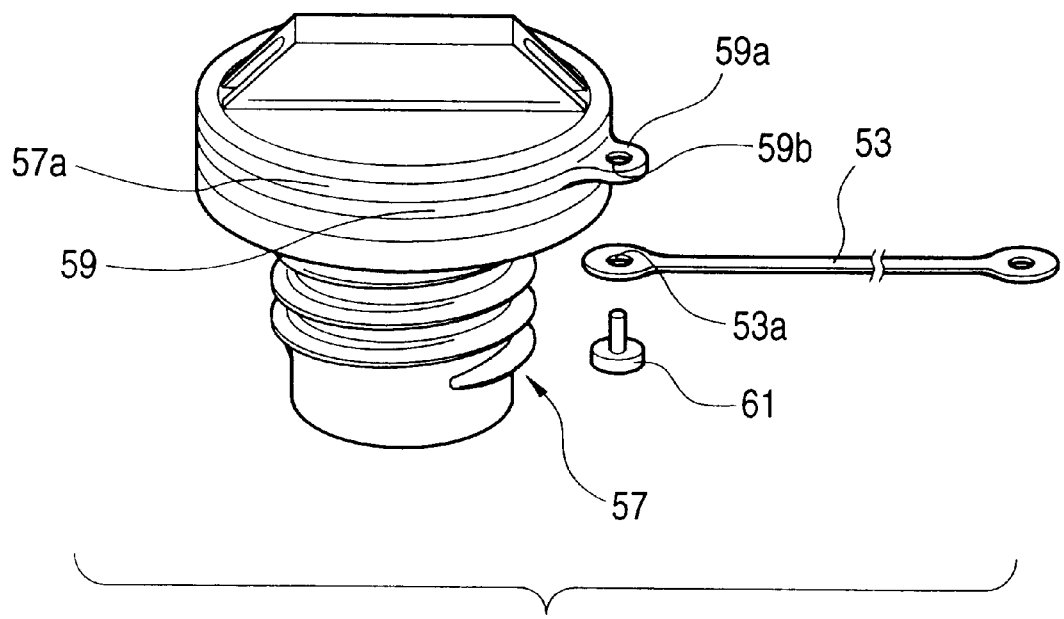
FIG. 14 is a perspective view illustrating a sixth embodiment of the string-attached cap in accordance with the present invention.

FIG. 14 shows a sixth embodiment of the string-attached cap in accordance with the present invention. In this embodiment, a ring member 59 is rotatably engaged in the outer periphery of a cap body 57a of a cap 57.

A projecting portion 59a projecting outwardly is formed on the ring member 59, and an attaching hole 59b is formed in this projecting portion 59a.

Figure 15:
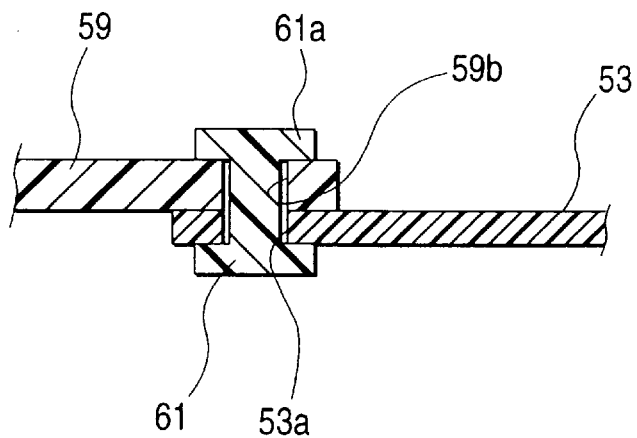
FIG. 15 is a cross-sectional view illustrating a state in which the coupling member shown in FIG. 14 is fastened to the ring member.

Then, as shown in FIG. 15, in a state in which a tip portion of a rivet-like fastening member 61 is inserted in the through hole 53a formed at one end of the coupling member 53, the tip portion of the fastening member 61 is inserted in the attaching hole 59b of the ring member 59, and the diameter of the tip portion of the fastening member 61 is enlarged by means of heat or ultrasonic waves so as to form a calked portion 61a, thereby fastening the coupling member 53 to the ring member 59.

In this embodiment, the coupling member 53 is formed of flexible electroconductive resin.

In addition, the cap 57, the ring member 59, and the fastening member 61 are formed of electroconductive resin.

In the string-attached cap of this embodiment, since the coupling member 53, the fastening member 61, and the ring member 59 are formed of electroconductive resin, static electricity generated in the cap 57 is allowed to pass through the coupling member 53 through the ring member, 59 and the fastening member 61 and escape to the vehicle body side. Consequently, it is possible to easily and positively prevent the cap 57 and the coupling member 53 from becoming charged with static electricity.

Figure 16:
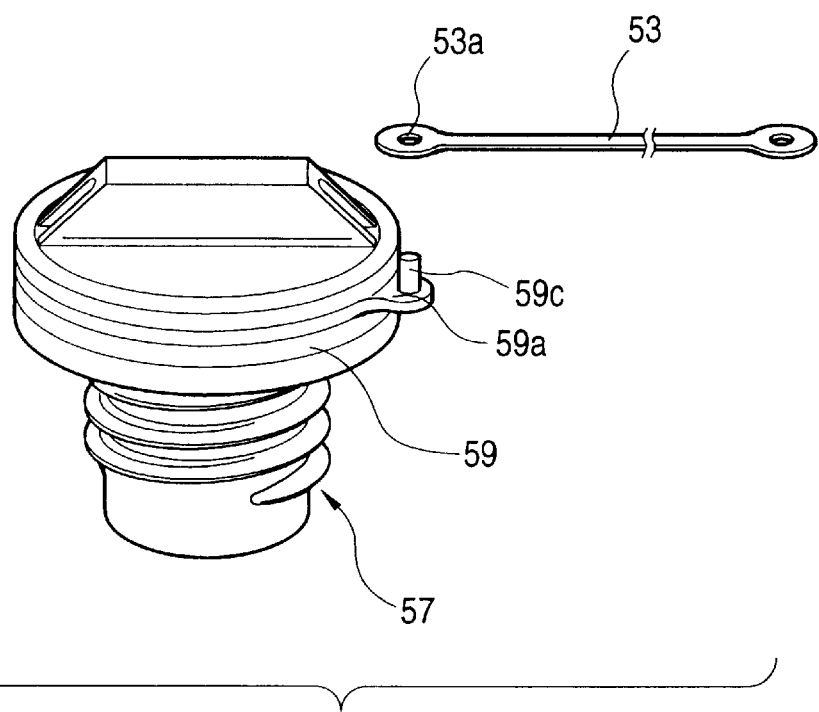
FIG. 16 is a perspective view illustrating a seventh embodiment of the string-attached cap in accordance with the present invention.

FIG. 16 shows a seventh embodiment of the string-attached cap in accordance with the invention. In this embodiment, a fastening member 59c is formed integrally with the projecting portion 59a of the ring member 59.

Figure 17:
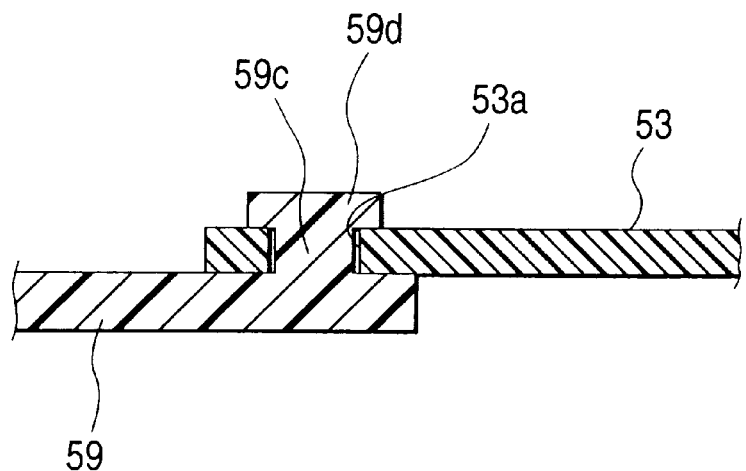
FIG. 17 is a cross-sectional view illustrating a state in which the coupling member shown in FIG. 16 is fastened to the ring member.
Figure 18:
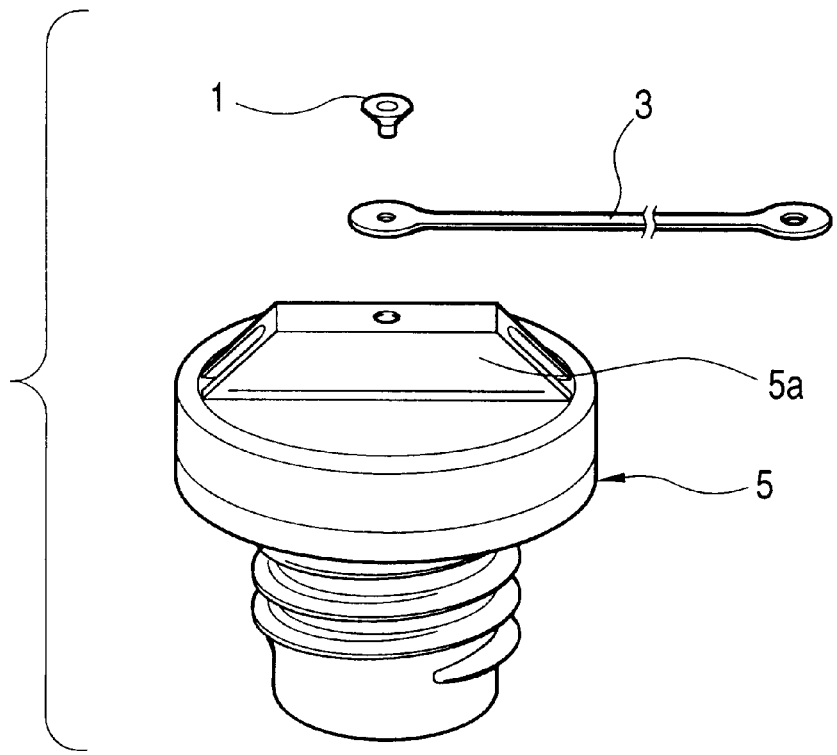
FIG. 18 is a perspective view illustrating a conventional string-attached cap.
Figure 19:
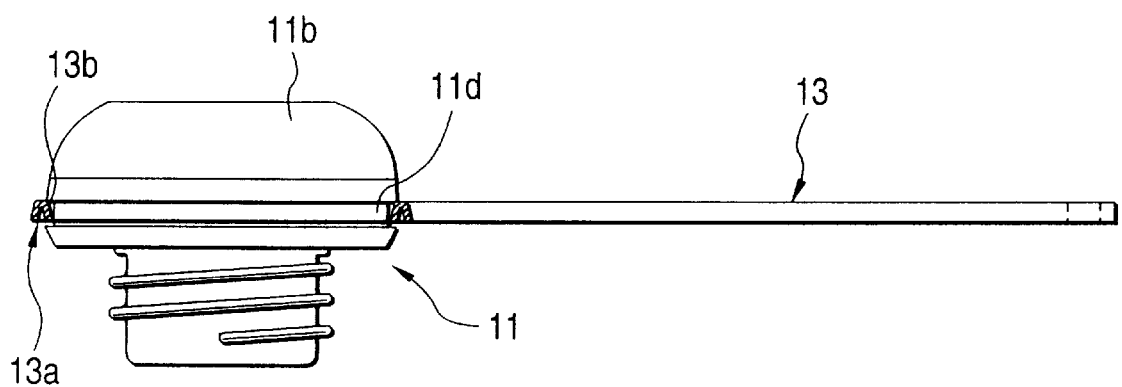
FIG. 19 is a side elevational view illustrating a conventional string-attached cap.

In this embodiment, as shown in FIG. 17, in a state in which the fastening member 59c is fitted in the through hole 53a formed at one end of the coupling member 53, the diameter of a distal end of the fastening member 59c is enlarged by means of heat or ultrasonic waves so as to form a calked portion 59d, thereby fastening the coupling member 53 to the handle portion 51a.

In this embodiment, the coupling member 53 is formed of flexible electroconductive resin.

In addition, the ring member 59, the fastening member 59c, and the cap 57 are formed of electroconductive resin.

In the string-attached cap of this embodiment as well, it is possible to obtain advantages similar to those of the sixth embodiment.

It should be noted that although, in the foregoing embodiments, a description has been given of the example in which the electroconductive resin is formed by mixing carbon powder into an insulating polymer, the present invention is not limited such an embodiment. For example, the electroconductive resin may be formed by mixing metal fibers such as stainless steel fibers and copper fibers, or metal powders, carbon fibers, or the like.

As described above, in the string-attached cap of the present invention, since the capping member and the coupling member are formed of the electroconductive resin, before the capping member is opened, static electricity charged in the human body is allowed to pass through the coupling member and escape to the vehicle body side, so that it is possible to easily and positively prevent the occurrence of spark discharge when the human body comes into contact with the cap. In addition, the aforementioned advantages can be ensured by forming other members including the coupling member, the fastening member, the ring member, and the like of the electroconductive resin.

Further, in the case where the ring part of the coupling member is inserted and fitted in the annular groove formed in the capping member, the coupling member does not constitute an obstruction when the capping member is turned.

Furthermore, if the capping member is inserted in the ring part of the coupling member, the engaging part at the inner periphery of the ring part is elastically deformed, and if, in this state, the capping member is inserted up to the annular groove, the engaging part is restored to its original state and is engaged in the annular groove. Therefore, the number of assembling steps can be substantially reduced as compared with the conventional art.

Moreover, since the electroconductive resin is formed by mixing carbon powder, carbon fibers, or metal fibers into an insulating polymer, it is possible to increase the strength of the coupling member.

Although a description has been given of the preferred embodiments of the invention, modifications and applications are possible without departing from the gist of the present invention.

What is claimed is:

1. A string-attached cap comprising:

a capping member formed of a first electroconductive resin; and an elongated coupling member having one end connected to said capping member, said elongated coupling member being formed of a second electroconductive resin which is flexible, wherein said first and second electroconductive resins are formed by a mixture of an insulating polymer and one of at least a carbon powder, carbon fibers and metal fibers, said insulating polymer in said first electroconductive resin does not comprise a block copolymer of a hard segment and a soft segment, and said insulating polymer in said second electroconductive resin comprises a block copolymer of a hard segment and a soft segment.

2. A string-attached cap according to claim 1, wherein said soft segment in said block copolymer contains a polyether component.

3. A string-attached cap comprising:

a capping member formed of a first electroconductive resin;

an elongated coupling member having one end connected to said capping member, said elongated coupling member being formed of a second electroconductive resin which is flexible; and a fastening member formed of a third electroconductive resin operative to fasten one end of said coupling member to said capping member, wherein said first and second electroconductive resins are formed by a mixture of an insulating polymer and one of at least a carbon powder, carbon fibers and metal fibers, said insulating polymer in said first electroconductive resin does not comprise a block copolymer of a hard segment and a soft segment, and said insulating polymer in said second electroconductive resin comprises a block copolymer of a hard segment and a soft segment.

4. A string-attached cap according to claim 3, wherein said soft segment in said block copolymer contains a polyether component.

5. A string-attached cap comprising:

a capping member formed of a first electroconductive resin;

a ring member formed of a second electroconductive resin operative to be engaged in an outer periphery of said capping member;

an elongated coupling member having one end connected to said ring member, said elongated coupling member being formed of a third electroconductive resin which is flexible; and a fastening member formed of a fourth electroconductive resin operative to fasten one end of said coupling member to said ring member, wherein said first and second electroconductive resins are formed by a mixture of an insulating polymer and one of at least a carbon powder, carbon fibers and metal fibers, said insulating polymer in said first electroconductive resin does not comprise a block copolymer of a hard segment and a soft segment, and said insulating polymer in said second electroconductive resin comprises a block copolymer of a hard segment and a soft segment.

6. A string-attached cap according to claim 5, wherein said soft segment in said block copolymer contains a polyether component.

7. A string-attached cap comprising:

a capping member formed of a first electroconductive resin and having an annular groove formed in an outer periphery thereof; and an elongated coupling member formed of a second electroconductive resin which is flexible, said coupling member having a ring part formed integrally at one end thereof, wherein an engaging part formed integrally with an inner periphery of said ring part is rotatably engaged in said annular groove of said cap, said first and second electroconductive resins are formed by a mixture of an insulating polymer and one of at least a carbon powder, carbon fibers and metal fibers, said insulating polymer in said first electroconductive resin does not comprise a block copolymer of a hard segment and a soft segment, and said insulating polymer in said second electroconductive resin comprises a block copolymer of a hard segment and a soft segment.

8. A string-attached cap according to claim 7, wherein said soft segment in said block copolymer contains a polyether component.

* * * * *